United States Patent
Tateno

(10) Patent No.: US 9,630,322 B2
(45) Date of Patent: Apr. 25, 2017

(54) INFORMATION PROCESSING APPARATUS, METHOD THEREFOR, MEASUREMENT APPARATUS, AND WORKING APPARATUS FOR ESTIMATING A POSITION/ORIENTATION OF A THREE-DIMENSIONAL OBJECT BASED ON RELATIVE MOTION

(71) Applicant: CANON KABUSHIKI KAISHA, Tokyo (JP)

(72) Inventor: Keisuke Tateno, Munich (DE)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 14/695,557

(22) Filed: Apr. 24, 2015

(65) Prior Publication Data
US 2015/0314452 A1 Nov. 5, 2015

(30) Foreign Application Priority Data

May 1, 2014 (JP) .................................. 2014-094873

(51) Int. Cl.
*G06K 9/00* (2006.01)
*B25J 9/16* (2006.01)
(Continued)

(52) U.S. Cl.
CPC .......... *B25J 9/1697* (2013.01); *B25J 9/1669* (2013.01); *G06T 5/003* (2013.01); *G06T 7/75* (2017.01);
(Continued)

(58) Field of Classification Search
None
See application file for complete search history.

(56) References Cited

U.S. PATENT DOCUMENTS 4,853,771 A * 8/1989 Witriol ................... B25J 9/1697
235/375
4,891,767 A * 1/1990 Rzasa .................... B25J 9/1697
382/151

(Continued)

FOREIGN PATENT DOCUMENTS

JP 2012-021958 A 2/2012

OTHER PUBLICATIONS

Tsai, "A versatile camera calibration technique for high-accuracy 3D machine vision metrology using off-the-shelf TV cameras and lenses", IEEE Journal of Robotics and Automation, vol. RA-3, No. 4, 1987, pp. 323-344.

(Continued)

*Primary Examiner* — Vu Le
*Assistant Examiner* — Samah Beg
(74) *Attorney, Agent, or Firm* — Carter, DeLuca, Farrell & Schmidt, LLP

(57) ABSTRACT

A shape model of an object to be measured is held. An image of the object obtained by a first device is inputted. Range information obtained by a second device is inputted, and the range information indicates surface positions of the object. A first degradation degree of the image caused by relative motion between the object and the first device, and a second degradation degree of the range information caused by relative motion between the object and the second device are estimated. A position and/or orientation of the object is estimated based on the image and/or range information, the shape model, and the first and second degradation degrees.

13 Claims, 9 Drawing Sheets

(51) Int. Cl.
*G06T 5/00* (2006.01)
*G06T 7/73* (2017.01)

(52) U.S. Cl.
CPC .............. *G05B 2219/40564* (2013.01); *G05B 2219/40622* (2013.01); *G06T 2207/10004* (2013.01); *G06T 2207/10028* (2013.01); *G06T 2207/20201* (2013.01); *G06T 2207/30164* (2013.01)

(56) References Cited

U.S. PATENT DOCUMENTS

| | | | | |
|---|---|---|---|---|
| 5,943,476 | A * | 8/1999 | Dougherty | B25J 9/1694 700/251 |
| 5,983,166 | A * | 11/1999 | Matsumoto | G01B 11/002 33/300 |
| 6,278,906 | B1 | 8/2001 | Piepmeier | B25J 9/1607 700/245 |
| 8,510,078 | B2 * | 8/2013 | Taguchi | B25J 9/1694 702/150 |
| 9,333,654 | B2 * | 5/2016 | Chen | B25J 9/1697 |
| 2009/0213219 | A1 * | 8/2009 | Eggert | G06T 7/285 348/148 |
| 2010/0289797 | A1 * | 11/2010 | Tateno | G06T 7/13 345/419 |
| 2010/0322517 | A1 * | 12/2010 | Kobayashi | G06T 7/0071 382/173 |
| 2010/0328682 | A1 * | 12/2010 | Kotake | G06T 7/0057 356/620 |
| 2011/0007176 | A1 * | 1/2011 | Hamano | H04N 5/23212 348/222.1 |
| 2011/0206274 | A1 * | 8/2011 | Tateno | G06T 7/0046 382/154 |
| 2012/0033071 | A1 * | 2/2012 | Kobayashi | G01B 11/002 348/139 |
| 2012/0148100 | A1 * | 6/2012 | Kotake | G06T 7/0046 382/103 |
| 2012/0262455 | A1 * | 10/2012 | Watanabe | G06T 7/0046 345/420 |
| 2012/0268567 | A1 * | 10/2012 | Nakazato | G01B 11/03 348/46 |
| 2012/0294534 | A1 * | 11/2012 | Watanabe | G06K 9/00214 382/195 |
| 2012/0316820 | A1 * | 12/2012 | Nakazato | G01B 11/25 702/94 |
| 2013/0010070 | A1 * | 1/2013 | Tateno | G01B 11/002 348/46 |
| 2013/0011018 | A1 * | 1/2013 | Tateno | G01B 11/002 382/106 |
| 2013/0108116 | A1 * | 5/2013 | Suzuki | G01B 11/002 382/106 |
| 2013/0230235 | A1 * | 9/2013 | Tateno | G06T 7/0046 382/154 |
| 2013/0243331 | A1 * | 9/2013 | Noda | G06K 9/6203 382/195 |
| 2013/0329948 | A1 * | 12/2013 | Minagawa | G06T 7/004 382/103 |
| 2015/0042839 | A1 * | 2/2015 | Komatsu | H04N 5/23212 348/222.1 |
| 2015/0125034 | A1 * | 5/2015 | Tateno | G06T 7/0046 382/103 |
| 2015/0292863 | A1 * | 10/2015 | Furihata | G01J 9/00 348/135 |
| 2016/0155235 | A1 * | 6/2016 | Miyatani | G06T 7/0046 382/103 |
| 2016/0371820 | A1 * | 12/2016 | Hiasa | G06T 5/003 |

OTHER PUBLICATIONS

Mochizuki et al., "Study on Method of Estimating Defocus Blur Strength Which is Not Space-Invariant in Still Image", Actual Use of Vision Technology Workshop ViEW2012, IS1-C5, 2012, pp. 1-20.

* cited by examiner

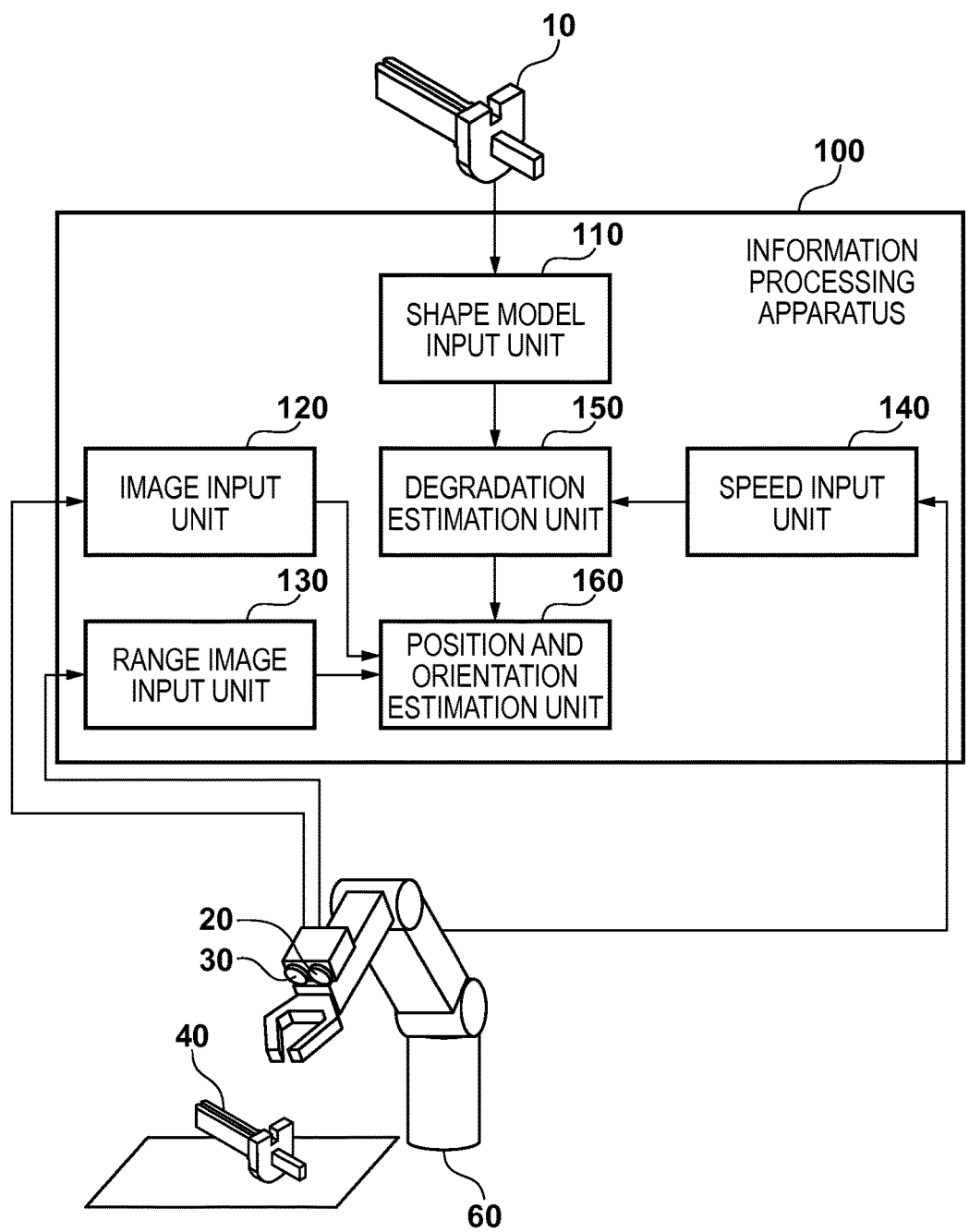

FEATURES OF LOCAL EDGES

FEATURES OF LOCAL SURFACES

OBJECT SHAPE

CALCULATION OF SECOND
INTER-CORRESPONDENCE DISTANCE

CALCULATION OF FIRST
INTER-CORRESPONDENCE DISTANCE

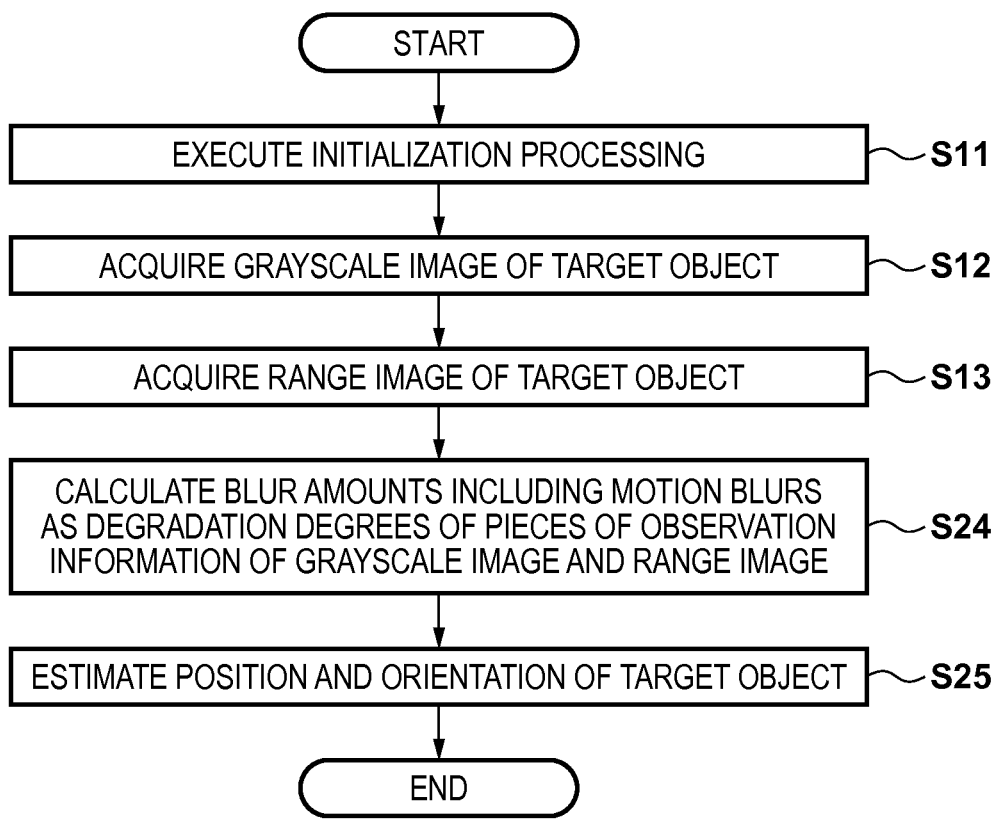
F I G. 8

INFORMATION PROCESSING APPARATUS, METHOD THEREFOR, MEASUREMENT APPARATUS, AND WORKING APPARATUS FOR ESTIMATING A POSITION/ORIENTATION OF A THREE-DIMENSIONAL OBJECT BASED ON RELATIVE MOTION

BACKGROUND OF THE INVENTION

Field of the Invention

The present invention relates to information processing of measuring the position and orientation of an object.

Description of the Related Art

Along with development of robot technology, robots are increasingly performing complex tasks such as assembly of industrial products, which have been conventionally done by humans. A robot grips parts using an end effector such as a hand, and assembles them. In this assembling operation, it is necessary to measure the relative position and orientation between the robot (hand) and a part to be gripped.

As a position and orientation measurement method, there is provided model fitting in which the three-dimensional shape model of an object is fitted to features detected from a two-dimensional image captured by a camera or range data measured by a range sensor.

In model fitting for a two-dimensional image, a position and orientation is measured so that a projected image obtained by projecting a three-dimensional shape model onto an image based on the position and orientation of an object fits detected features. In model fitting for range data, respective points in a range image expressing range data are converted into a group of three-dimensional points each having three-dimensional coordinates, and a position and orientation is measured so that a three-dimensional shape model fits the three-dimensional point group in a three-dimensional space.

It is possible to measure the position and orientation of an object with higher accuracy using both measurement information obtained from a two-dimensional image and measurement information obtained from range data.

Japanese Patent Laid-Open No. 2012-021958 (literature 1) describes a method of selecting, in accordance with the shape of an object to be measured (to be referred to as a "target object" hereinafter), one of a position and orientation measurement method using measurement information obtained from a two-dimensional image, a position and orientation measurement method using measurement information obtained from range data, and a method using both the position and orientation measurement methods, and measuring the position and orientation of the target object by the selected method. Since the method described in literature 1 performs measurement by a method optimum for the shape of a target object, measurement can be performed with high accuracy at high speed.

However, when a capturing device captures a target object while moving, the influence of a motion blur degrades the estimation accuracy of the position and orientation. It is difficult to estimate the influence of a motion blur based on only shape information. In the method of measuring the position and orientation by selecting observation information from the shape information, which is described in literature 1, therefore, when a capturing device captures a target object while moving, it is impossible to measure the position and orientation of the target object with high accuracy.

SUMMARY OF THE INVENTION

In one aspect, an information processing apparatus comprising: a holding unit configured to hold a shape model of an object to be measured; a first input unit configured to input an image of the object obtained by a first device; a second input unit configured to input range information obtained by a second device, wherein the range information indicates surface positions of the object; a first estimation unit configured to estimate a first degradation degree of the image caused by relative motion between the object and the first device, and a second degradation degree of the range information caused by relative motion between the object and the second device; and a second estimation unit configured to estimate a position and/or orientation of the object based on the image and/or range information, the shape model, and the first and second degradation degrees.

According to the aspect, it is possible to measure the position and/or orientation of an object to be measured with high accuracy even when the object is captured during movement.

Further features of the present invention will become apparent from the following description of exemplary embodiments with reference to the attached drawings.

BRIEF DESCRIPTION OF THE DRAWINGS

FIG. 1 is a block diagram showing the arrangement of an information processing apparatus according to the first embodiment.

FIG. 8 is a flowchart for explaining position and orientation estimation processing performed by the information processing apparatus according to the second embodiment.

DESCRIPTION OF THE EMBODIMENTS

Figure 2C:
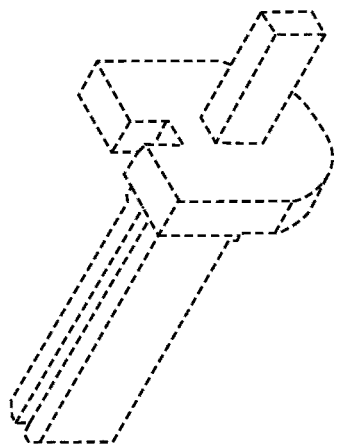
FIGS. 2A to 2C are views for explaining a three-dimensional shape model.

Measurement and information processing according to embodiments of the present invention will be described in detail below with reference to the accompanying drawings. Note that arrangements to be described in the following embodiments are merely examples, and the present invention is not limited to the illustrated arrangements.

First Embodiment

Overview of Estimation of Position and Orientation

In the first embodiment, a method will be described in which the degradation degree of each of pieces of observation information obtained from a two-dimensional image and range data is predicted based on the shape of model data simulating an object to be measured (to be referred to as a "target object" hereinafter), and the relative moving direction and speed of the target object at the time of capturing, and then the position and orientation of the target object is estimated by mainly using the observation information with little degradation. Note that the position and orientation indicates the relationship of the position and orientation between the target object and a capturing device for capturing the target object.

The first embodiment assumes that a target object is captured while the target object or a capturing device moves. When capturing is performed during movement (to be referred to as "a capture on move" hereinafter), a motion blur occurs in a captured image, and information readily degrades, for example, coordinates in observation information has random errors. Since degradation of observation information largely influences the estimation accuracy of the position and orientation, it is desirable not to use degraded observation information for estimation of the position and orientation.

The tendency of a motion blur to occur, which is a main cause of degradation of information in a capture on move, largely changes depending on the shape of the target object and the relative moving speed between the capturing device and the target object.

For example, when a capturing device captures a target object including a flat portion, if the capturing device moves along the plane of the target object (in a direction perpendicular to the normal direction of the plane), a change in distance during an exposure time is small, and the occurrence amount of a motion blur of the image of the target object in range data is small. On the other hand, in a two-dimensional image, the target object is captured on the image while making a large movement, and thus the occurrence amount of a motion blur of the image of the target object in the two-dimensional image is large.

Alternatively, if the capturing device moves in the normal direction of the plane of the target object, a change in distance during an exposure time is large, and the occurrence amount of a motion blur of the image of the target object in range data is large. On the other hand, since a change in image is small in a two-dimensional image, the occurrence amount of a motion blur of the image of the target object in the two dimensional image is small.

As described above, there is the characteristic that the degradation degree of observation information obtained from a two-dimensional image and that of observation information obtained from range data change depending on the shape and relative moving direction of a target object so that the influence of a motion blur changes depending on the shape and relative moving direction of the target object.

Based on the shape of the target object and information of the relative position and orientation and speed between the capturing device and the target object, the degradation degree of each of pieces of observation information of the two-dimensional image and range data is predicted, and the position and orientation of the target object is estimated by mainly using observation information with little degradation. That is, the degradation degree of each piece of observation information based on a motion blur is predicted, and the position and orientation is estimated by weighting each piece of observation information based on the degradation degree. By predicting the degradation degree using information of the relative position and orientation and speed in addition to the shape of the target object, and estimating the position and orientation by mainly using observation information with little degradation, it is possible to estimate the position and orientation of the object with high accuracy, as compared with the method of selecting observation information based on only the shape information, which is described in literature 1.

[Apparatus Arrangement]

FIG. 1 is a block diagram showing the arrangement of an information processing apparatus 100 according to the first embodiment. A shape model input unit 110 receives a three-dimensional shape model 10 expressing the shape of a target object 40, and outputs the three-dimensional shape model 10 to a degradation estimation unit 150. Note that the three-dimensional shape model 10 is stored in a storage device provided inside or outside the information processing apparatus 100, a server apparatus on a wired or wireless network connected to the information processing apparatus 100, or the like.

Figure 2B:
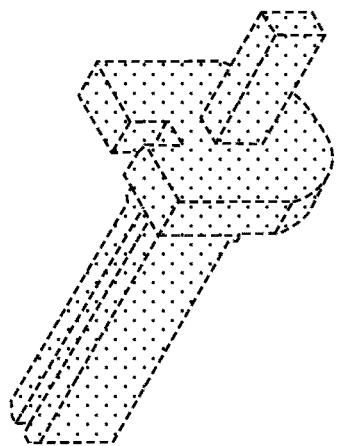
Figure 2A:
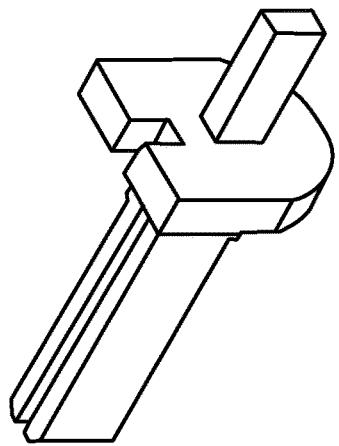

The three-dimensional shape model 10 will be explained with reference to FIGS. 2A to 2C. FIG. 2A shows an example of an object shape. The object shape is expressed by the three-dimensional shape model 10 formed by the features of local surfaces shown in FIG. 2B and the features of local edges shown in FIG. 2C. The features of the local surfaces indicate local three-dimensional plane information on the object surface made of the three-dimensional position and the three-dimensional normal direction. The features of the local edges indicate local three-dimensional line segment information on the object contour made of the three-dimensional position and the three-dimensional line segment direction. Note that "geometric features" indicate both the features of the local surfaces and the features of the local edges.

Shape information held as the three-dimensional shape model 10 need only be three-dimensional geometric information representing a target object shape and an expression form is not limited. For example, another expression form such as shape information of a polygonal form expressed by a set of simple three-dimensional points, a set of three-dimensional lines representing a ridge, or a set of lines and a plane defined by three three-dimensional points may be used.

An image input unit 120 receives a two-dimensional image output from an image capturing device 20. The image capturing device 20 is a camera for capturing a general two-dimensional image. A two-dimensional image captured by the image capturing device 20 may be a grayscale image or color image. The following description assumes that the image capturing device 20 captures a grayscale image. Intrinsic parameters such as the focal length, principal point position, and lens distortion parameters of the image capturing device 20 are obtained with reference to the specifications of a device used as the image capturing device 20 or are calibrated in advance by a method disclosed in literature 2 below.

Literature 2: R. Y. Tsai, "A versatile camera calibration technique for high-accuracy 3D machine vision metrology using off-the-shelf TV cameras and lenses", IEEE Journal of Robotics and Automation, vol. RA-3, No. 4, 1987.

A range image input unit 130 receives a range image output from a range image capturing device 30. A range sensor for measuring three-dimensional coordinates as position information of a point on the surface of the target object 40 and outputting a range image indicating range information is used as the range image capturing device 30. The range image is an image in which each pixel has depth information.

A one-shot active sensor for irradiating the target object 40 with a multi-slit line assigned with color IDs of different wavelengths and performing range measurement by triangulation by capturing reflected light with the camera can be used as the range sensor. The range sensor, however, is not limited to this. A Time-of-flight type sensor using the flight time of light may be used. Alternatively, a passive sensor for calculating the depth of each pixel by triangulation from an image captured by a stereo camera may be used. In addition, any sensor capable of measuring a range image can be used.

Assume that the optical axis of the image capturing device 20 coincides with that of the range image capturing device 30, and the correspondence between each pixel of a grayscale image output from the image capturing device 20 and each pixel of a range image output from the range image capturing device 30 is known.

However, the present invention is not limited to the case in which the grayscale image and the range image are obtained by the same viewpoint. For example, the position and orientation of the image capturing device 20 may be different from that of the range image capturing device 30, and a grayscale image and a range image may be captured from different viewpoints. In this case, it is assumed that the relative position and orientation between the image capturing device 20 and the range image capturing device 30 (to be referred to as "between the capturing devices" hereinafter) is already known. A three-dimensional point group in the range image is projected onto the grayscale image to obtain the correspondence between each pixel of the grayscale image and each pixel of the range image. In other words, as long as the relative position and orientation between the capturing devices capable of capturing the single target object 40 is known and the correspondence between these images can be calculated, the positional relationship between the capturing devices is not particularly limited.

A speed input unit 140 receives the speed (to be referred to as the "relative speed" hereinafter) in the relative position and orientation between the capturing device (the image capturing device 20 and range image capturing device 30) and the target object 40 from a robot 60. The relative speed is expressed by parameters of six degrees of freedom including the speeds in the three-dimensional relative position and the speeds in the three-dimensional orientation. Note that a capturing device integrating the image capturing device 20 and the range image capturing device 30 will be referred to as a "capturing device 320" hereinafter.

The robot 60 is a movable device which has a plurality of movable axes including axes for rotational motion or translation and changes the position and orientation of the capturing device 320, and is a robot arm of six degrees of freedom which has the capturing device 320 attached to the distal end of the arm and includes six axes for rotational motion.

Assume that the capturing device 320 is attached to the arm distal end. The position and orientation from the arm distal end to the capturing device 320 is acquired in advance as the offset position and orientation of the capturing device 320, and held as unchanged data. That is, the position and orientation of the capturing device 320 is calculated by adding the offset position and orientation to the position and orientation of the arm distal end.

The relative speed indicating an amount by which the relative position and orientation between the capturing device 320 and the target object 40 moves per unit time is calculated from a change in position and orientation of the capturing device 320 during a position and orientation acquisition time. For example, the relative speed of the capturing device 320 can be acquired from the motion information of the robot 60. That is, the control module of the robot 60 calculates a three-dimensional speed in the position and orientation of the capturing device 320 attached to the arm distal end, and inputs information indicating the relative speed to the speed input unit 140.

A device used as the robot 60 is not limited to the above one. For example, a vertical multi-joint robot having seven rotation axes, a scalar robot, or a parallel-link robot may be used. In addition, a robot of any form may be used as long as the robot has a plurality of movable axes including axes for rotational motion or translation and it is possible to acquire motion information.

A method of acquiring a relative speed is not limited to the method using the motion information of the robot 60. For example, a physical sensor such as a magnetic sensor or ultrasonic sensor for measuring the position and orientation of each of six degrees of freedom may be attached to the capturing device 320, and a relative speed may be calculated from the output of the sensor. If movement of the capturing device 320 during capturing can be limited to rotational motion, a gyro sensor may be attached to the capturing device 320 to measure the rotational speed. Alternatively, if the capturing device 320 is fixed and the target object 40 moves, the above-described sensor may be attached to the target object 40 and a relative speed may be calculated based on information output from the sensor. In other words, any method may be used as long as the relative speed between the capturing device 320 and the target object 40 can be calculated. Selection of a measuring method and a device is not limited.

The degradation estimation unit 150 estimates the degradation degree of the observation information of the grayscale image and that of the observation information of the range image based on the three-dimensional shape model 10 input from the shape model input unit 110 and the relative speed input from the speed input unit 140, which will be described in detail later. In this embodiment, a motion blur amount of each image is estimated as the degradation degree of the observation information. That is, an amount by which an edge in the grayscale image moves on the image plane during an exposure time and an amount by which the three-dimensional point group in the range image moves in the three-dimensional space during a measurement time are estimated as motion blur amounts. That is, the motion blur amount represents the moving amount of each piece of observation information during the exposure (measurement) time.

Information indicating the degradation degree of the observation information is not limited to the motion blur amount, and may be any information which can represent the degradation amount of the observation information based on the relative movement between the capturing device 320 and the target object 40. For example, the degradation degree of the observation information of the range image may be represented as a blur amount in a projected image of pattern light for range measurement, instead of three-dimensional coordinates. The degradation degree of the observation information of the grayscale image may be represented as a moving amount in the three-dimensional space, which has been calculated by performing back projection for the edge in the grayscale image onto the three-dimensional space.

A position and orientation estimation unit 160 estimates the position and orientation between the capturing device 320 and the target object 40 based on the estimated motion blur amounts, the observation information of the grayscale image, the observation information of the range image, and the three-dimensional shape model 10.

Figure 9:
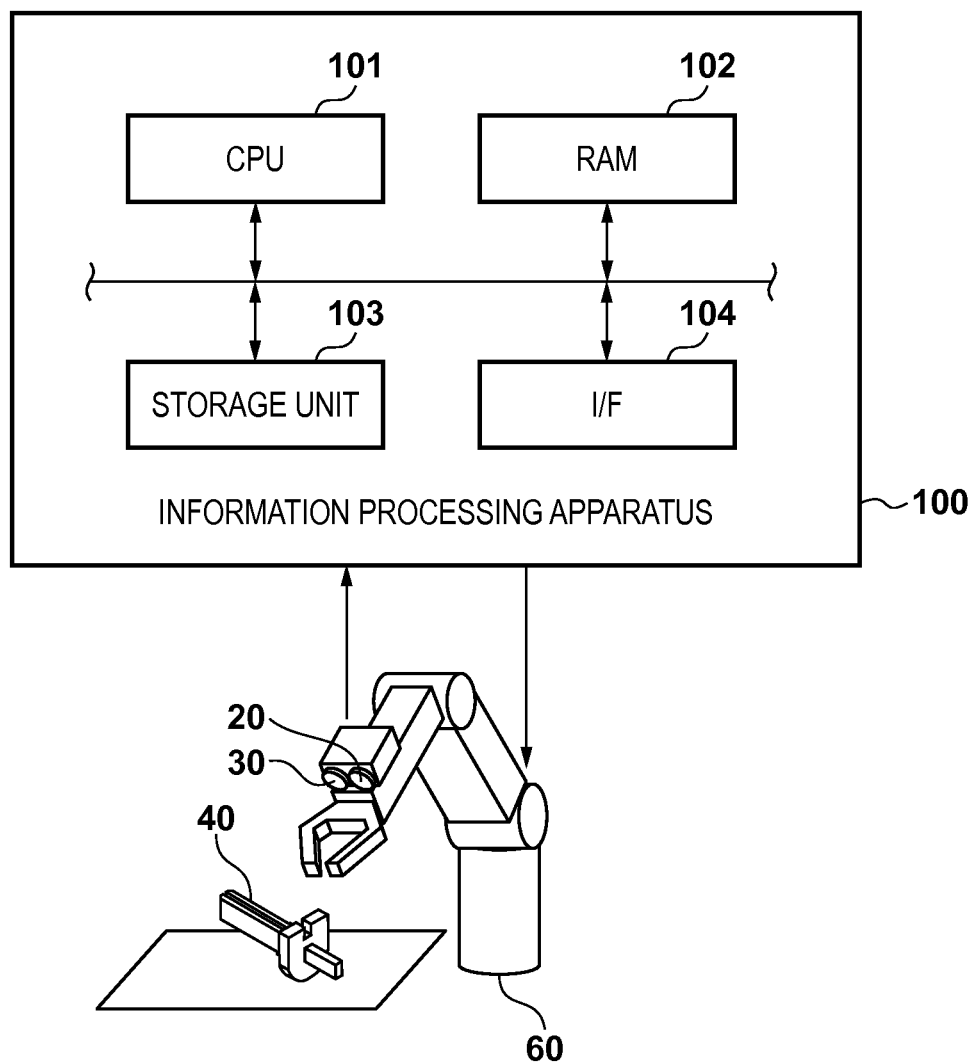
FIG. 9 is a view for explaining an application of an information processing apparatus for estimating a position and orientation.

Note that the respective components of the information processing apparatus 100 and processes and functions (to be described later) are implemented when a microprocessor (CPU) 101 of the information processing apparatus 100 serving as a computer apparatus uses a random access memory (RAM) 102 as a work memory to execute programs stored in a nonvolatile memory such as a read only memory (ROM) and a storage unit 103 such as a hard disk drive, as shown in FIG. 9. Various control signals and various data are input/output through a general-purpose interface (I/F) 104 such as a USB (Universal Serial Bus) interface.

[Position and Orientation Estimation Processing]

Figure 3:
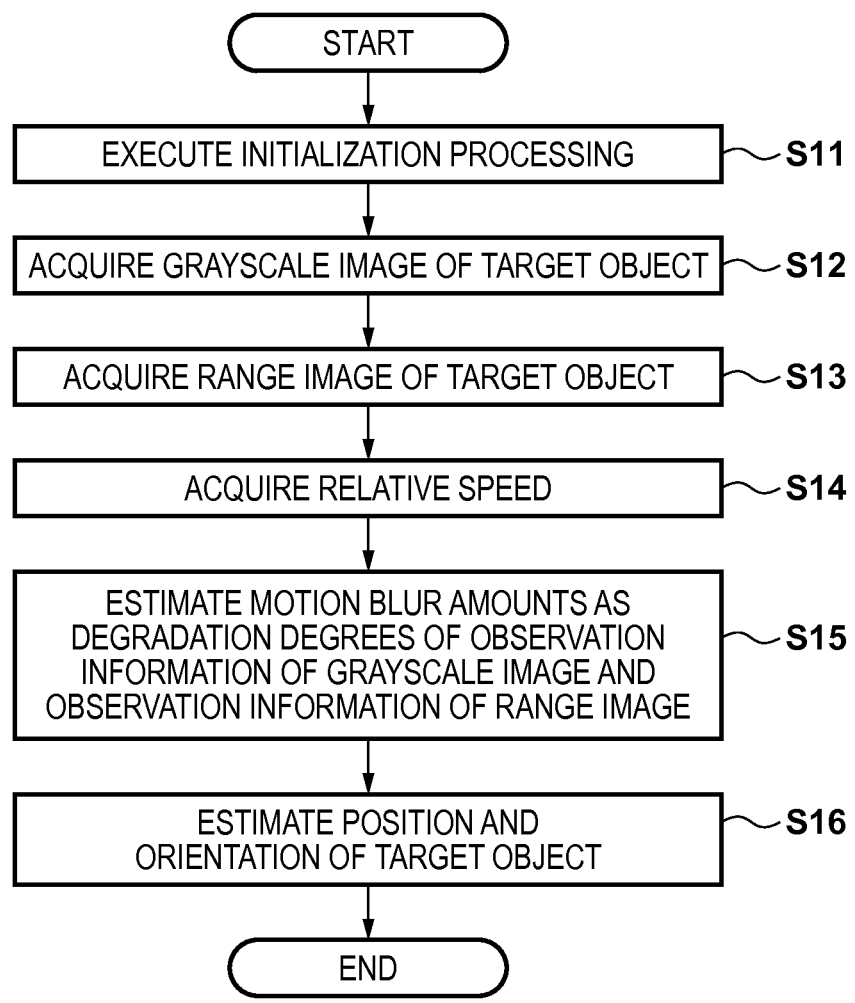
FIG. 3 is a flowchart for explaining position and orientation estimation processing performed by the information processing apparatus according to the first embodiment.

Position and orientation estimation processing performed by the information processing apparatus 100 according to the first embodiment will be described with reference to a flowchart shown in FIG. 3.

For example, when start of estimation of a position and orientation is instructed through an operation panel (not shown), the information processing apparatus 100 performs initialization processing (S11). In the initialization processing, a coarse value (to be referred to as a "coarse position and orientation" hereinafter) of the position and orientation of the target object 40 with respect to the capturing device 320 is input. For example, assuming that an approximate position and orientation in which the target object 40 is arranged is known in advance, the value is input as a coarse value.

A method of setting a coarse position and orientation is not limited to this. For example, the information processing apparatus 100 may continuously perform measurement along the time axis, and the previous measurement value may be used as a coarse position and orientation. Alternatively, the speed and angular velocity of the target object 40 may be estimated by a time-series filter based on the measurement value of the past position and orientation. The current position and orientation predicted from the past position and orientation and the estimated speed and acceleration may be set as a coarse position and orientation. Images obtained by capturing the target object 40 in various orientations may be held as templates, and template matching may be performed for an input grayscale image to estimate the approximate position and orientation of the target object 40, and the estimated value may be set as a coarse position and orientation.

When another sensor can measure the position and orientation of the target object 40, the output value of the other sensor may be used as a coarse position and orientation, as a matter of course. The sensor may be a magnetic sensor for measuring the position and orientation by detecting, by a receiver mounted on the target object 40, the magnetic field generated by a transmitter, or an optical sensor for measuring the position and orientation by capturing, by a camera fixed to a scene, a marker arranged on the target object 40. In addition, any other sensors can be used as long as they measure the position and orientation of six degrees of freedom.

The image input unit 120 acquires a grayscale image of the target object 40 (S12). That is, the image input unit 120 acquires a grayscale image and an exposure time Ti in the capturing operation from the image capturing device 20.

The range image input unit 130 acquires a range image of the target object 40 (S13). That is, the range image input unit 130 acquires a range image and a measurement time Tr at the time of capturing (measurement) from the range image capturing device 30. Note that a distance from the range image capturing device 30 to the surface of the target object 40 is recorded in the range image. As described above, since the optical axis of the image capturing device 20 coincides with that of the range image capturing device 30, the correspondence between each pixel of the grayscale image and each pixel of the range image is known.

The speed input unit 140 acquires a relative speed (S14). The relative speed is acquired as a six-dimensional vector V formed from speed information (Vx, Vy, Vz) of a three-dimensional position and speed information (Vwx, Vwy, Vwz) of a three-dimensional orientation.

$$\vec{V} = [Vx\ Vy\ Vz\ Vwx\ Vwy\ Vwz]^T \quad (1)$$

where T represents a transposed matrix.

A relative speed acquisition method is not limited to this. For example, the relative speed may be calculated from a change in position and orientation of the capturing device 320 during a predetermined time by acquiring the position and orientation of the arm distal end from the control module of the robot 60, and adding the offset position and orientation of the capturing device 320 to the position and orientation of the arm distal end. Selection of a calculation method and sensor is not limited as long as it is possible to acquire the speed in the position and orientation of six degrees of freedom of the capturing device 320.

Based on the acquired relative speed, the degradation estimation unit 150 estimates motion blur amounts as the degradation degree of the observation information of the grayscale image and that of the observation information of the range image (S15). A motion blur amount is estimated for each of the features of local edges and the features of local surfaces of the three-dimensional shape model 10 associated with the observation information, which will be described in detail later.

The position and orientation estimation unit 160 calculates the correspondence between the three-dimensional shape model 10 and the grayscale image and range image, and estimates the position and orientation of the target object 40 based on estimated values of motion blur amounts (S16), which will be described in detail later.

Degradation Estimation Unit

Figure 4:
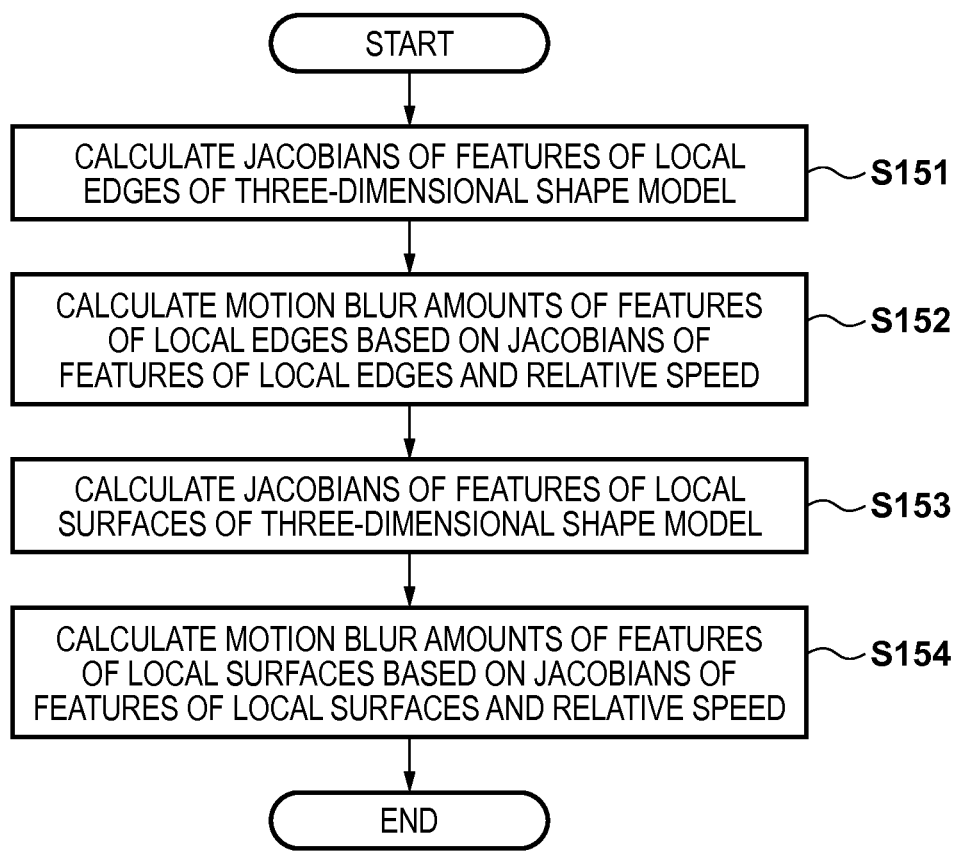
FIG. 4 is a flowchart for explaining processing of estimating the degradation degree of information.

The processing (S15) of estimating the degradation degree of information will be described with reference to a flowchart shown in FIG. 4.

The degradation estimation unit 150 calculates the Jacobians of the features of the local edges of the three-dimensional shape model 10 (S151). The Jacobian of the feature of each local edge is a value representing the rate of change of the distance on the image between the feature of the local edge and an image edge when the parameters of the six degrees of freedom of the position and orientation change.

The Jacobian will be described with reference to FIGS. 5A and 5B. FIG. 5A is a view for explaining calculation of a straight line-point distance between the feature of a local edge and an image feature in the grayscale image. When the feature of a local edge is projected onto the image based on a coarse position and orientation s of the target object 40, a signed distance (to be referred to as the "first inter-correspondence distance" hereinafter) $err_{2D}$ between the feature of the local edge and its corresponding image feature is calculated by:

$$err_{2D} = Nu(u'-u) + Nv(v'-v) \quad (2)$$

where (u, v) represents the projection position of the feature of the local edge, (Nu, Nv) represents the normal direction (unit vector) of the projection position, and (u', v') represents the coordinates of the image feature corresponding to the feature of the local edge.

The coarse position and orientation s of the target object 40 is represented by a six-dimensional vector, and includes three elements (s1, s2, s3) indicating the position of the target object 40 and three elements (s4, s5, s6) indicating the orientation of the target object 40. The three elements indicating the orientation are expressed by, for example, Euler angles or a three-dimensional vector in which directions express rotation axes passing through an origin and a norm expresses a rotation angle. By partially differentiating the first inter-correspondence distance $err_{2D}$ by the respective parameters of the coarse position and orientation s, a Jacobian matrix $J_{2D}$ of the feature of the local edge is calculated by:

$$J_{2D}=[\partial err_{2D}/\partial s1\, \partial err_{2D}/\partial s2\, \partial err_{2D}/\partial s3\, \partial err_{2D}/\partial s4\, \partial err_{2D}/\partial s5\, \partial err_{2D}/\partial s6] \quad (3)$$

As a result of partial differentiation, the terms of the coordinates (u', v') of the image feature are eliminated, and the Jacobian matrix can be calculated based on only the information of the feature of the local edge and the coarse position and orientation s. The above procedure is performed for the feature of each local edge, thereby calculating a Jacobian for the feature of each local edge.

The degradation estimation unit 150 calculates the motion blur amounts of the features of the local edges based on the Jacobians of the features of the local edges and the relative speed (S152). A distance change Ve between the feature of each local edge and an edge in the grayscale image, which occurs when the capturing device 320 moves at the relative speed $\vec{V}$ during the exposure time Ti of the grayscale image, is calculated by:

$$Ve = Ti \cdot J_{2D} \cdot \vec{V} \quad (4)$$

The distance change Ve is a scalar amount, and represents an amount by which the two-dimensional position of the feature of the local edge projected onto the image plane moves during the exposure time Ti. Assuming that the motion blur amount of the feature of the local edge is equal to that of the observation information of the grayscale image corresponding to the feature of the local edge, the distance change Ve can be regarded as the motion blur amount of the observation information of the grayscale image corresponding to the feature of the local edge. The above processing is performed for the features of all the local edges, thereby calculating a motion blur amount for the features of all the local edges.

The degradation estimation unit 150 calculates the Jacobians of the features of the local surfaces of the three-dimensional shape model 10 (S153). The Jacobian of the feature of each local surface is a value representing the rate of change of the distance in the three-dimensional space between the feature of the local surface and a range point when the parameters of the six degrees of freedom of the position and orientation change.

Figure 5B:
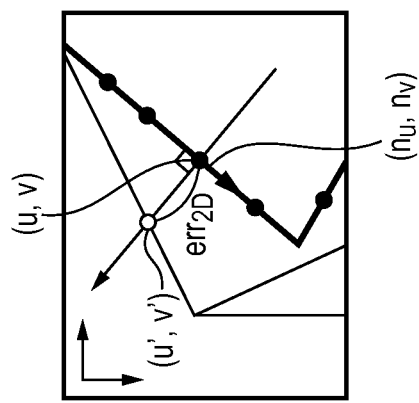
FIGS. 5A and 5B are views for explaining a Jacobian.
Figure 5A:
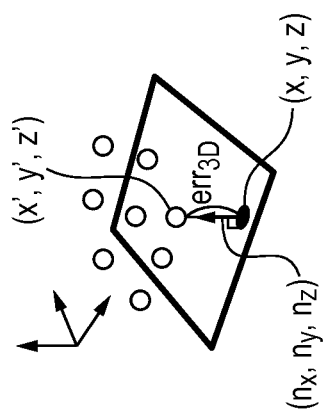

FIG. 5B is a view for explaining calculation of a plane-point distance between the feature of a local surface and a correspondence point (a three-dimensional point in the range image). When the feature of a local surface is projected onto a camera coordinate system based on the coarse position and orientation s of the target object 40, a signed distance (the second inter-correspondence distance) $err_{3D}$ in the three-dimensional space between the feature of the local surface and a three-dimensional point in the corresponding range image is calculated by:

$$err_{3D} = Nx(x'-x) + Ny(y'-y) + Nz(z'-z) \quad (5)$$

where (x, y, z) represents the projection coordinates of the feature of the local surface, (Nx, Ny, Nz) represents the normal direction (unit vector) of the projection coordinates, and (x', y', z') represents the coordinates of the three-dimensional point in the range image corresponding to the feature of the local surface.

Similarly to the Jacobian of the feature of the local edge, by partially differentiating the second inter-correspondence distance $err_{3D}$ by the respective parameters of the coarse position and orientation s of the virtual camera, a Jacobian matrix $J_{3D}$ of the feature of the local surface is calculated by:

$$J_{3D}=[\partial err_{3D}/\partial s1\, \partial err_{3D}/\partial s2\, \partial err_{3D}/\partial s3\, \partial err_{3D}/\partial s4\, \partial err_{3D}/\partial s5\, \partial err_{3D}/\partial s6] \quad (6)$$

As a result of partial differentiation, the terms of the coordinates (x', y', z') of the three-dimensional point in the range image are eliminated, and the Jacobian matrix can be calculated based on only the information of the feature of the local surface and the coarse position and orientation s. The above procedure is performed for the feature of each local surface, thereby calculating a Jacobian for the feature of each local surface.

The degradation estimation unit 150 calculates the motion blur amounts of the features of the local surfaces based on the Jacobians of the features of the local surfaces and the relative speed (S154). A distance change Vr between the feature of each local surface and a range point in the range image, which occurs when the capturing device 320 moves at the relative speed $\vec{V}$ during the measurement time Tr of the range image, is calculated by:

$$Vr = Tr \cdot J_{3D} \cdot \vec{V} \quad (7)$$

The distance change Vr is a scalar amount, and represents an amount by which the feature of the local surface moves in the three-dimensional space during the measurement time Tr. Assuming that the motion blur amount of the feature of the local surface is equal to that of the observation information of the range image corresponding to the feature of the local surface, the distance change Vr can be regarded as the motion blur amount of the observation information of the range image corresponding to the feature of the local surface. The above processing is performed for the features of all the local surfaces, thereby calculating a motion blur amount for the features of all the local surfaces.

Position and Orientation Estimation Unit

Figure 6:
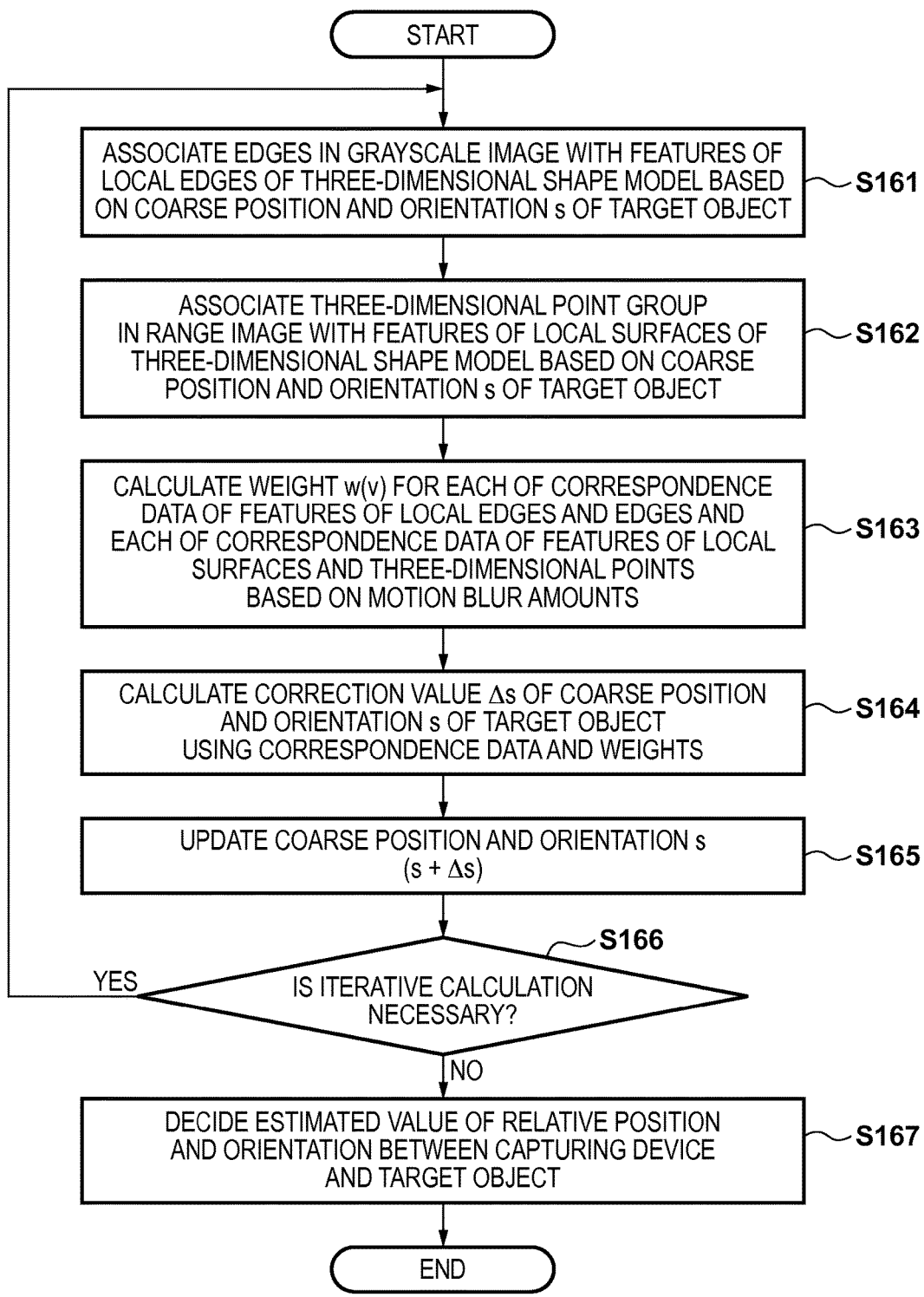
FIG. 6 is a flowchart for explaining position and orientation estimation processing.

The position and orientation estimation processing (S16) will be described with reference to a flowchart shown in FIG. 6.

The position and orientation estimation unit 160 associates edges in the grayscale image with the features of the local edges of the three-dimensional shape model 10 based on the coarse position and orientation s of the target object 40 (S161). By using the coarse position and orientation s and the calibrated intrinsic parameters of the range image capturing device 30, the feature of each local edge is projected onto the grayscale image, the projection position of the feature of the local edge is calculated, and the edge in the grayscale image is associated with the feature of the local edge. If a plurality of edges are detected in correspondence with the feature of each local edge, an edge nearest to the feature of the local edge on the image is to be associated with the feature of the local edge.

The position and orientation estimation unit 160 associates a three-dimensional point group in the range image with the features of the local surfaces of the three-dimensional shape model 10 based on the coarse position and orientation s (S162). By using the coarse position and orientation s and the calibrated intrinsic parameters of the range image capturing device 30, the feature of each local surface is projected onto the range image, and a range point in the range image corresponding to the feature of the local surface is associated with the feature of the local surface as a three-dimensional point corresponding to the feature of the local surface.

The position and orientation estimation unit 160 estimates the position and orientation of the target object 40 based on correspondence data indicating an edge in the grayscale image corresponding to the feature of each local edge and correspondence data indicating a three-dimensional point corresponding to the feature of each local surface. At this time, the position and orientation estimation unit 160 calculates a correction value Δs of the coarse position and orientation s which minimizes the error between measurement data and the three-dimensional shape model 10 based on the correspondence data. Calculation of the correction value Δs will be described in detail below.

Let i−1 be the number of features of local edges associated with edges in the grayscale image, $err_{2D}i$ be the inter-correspondence distance between the feature of each local edge and the edge, and $J_{2D}i$ be the Jacobian. On the other hand, let j−1 be the number of features of local surfaces associated with range points in the range image, $err_{3D}j$ be the inter-correspondence distance between the feature of each local surface and the range point, and $J_{3D}j$ be the Jacobian. The correction value Δs of the coarse position and orientation s which minimizes each inter-correspondence distance (error) is given by:

$$\begin{bmatrix} J_{2D}0 \\ \vdots \\ J_{2D}i \\ J_{3D}0 \\ \vdots \\ J_{3D}j \end{bmatrix} \begin{bmatrix} \Delta s1 \\ \Delta s2 \\ \Delta s3 \\ \Delta s4 \\ \Delta s5 \\ \Delta s6 \end{bmatrix} = \begin{bmatrix} err_{2D}0 \\ \vdots \\ err_{2D}i \\ err_{3D}0 \\ \vdots \\ err_{3D}j \end{bmatrix} \quad (8)$$

Let J be a Jacobian, and E be an inter-correspondence distance (error). Then, linear simultaneous equation (8) can be rewritten into:

$$J\Delta S = E \quad (9)$$

If the respective correspondence data include correspondence data with a large motion blur amount, the accuracy of the correction value Δs decreases. To cope with this, the position and orientation estimation unit 160 calculates the weight of each correspondence data based on the motion blur amounts calculated for the features of the local edges and the features of the local surfaces (S163). In other words, a linear simultaneous equation is formulated so as to mainly use correspondence data with a small motion blur amount, thereby giving a small weight to correspondence data with a large motion blur amount and a large weight to correspondence data with a small motion blur amount. If a motion blur amount is represented by v, a weight w(v) is determined by Tukey's function given by:

if $(v \leq c)$ $w(v) = \{1 + (v/c)^2\}^2;$ else $w(v) = 0; \quad (10)$ where c is a constant.

The function of giving a weight need not be Tukey's function. Any other functions such as the Huber function may be used as long as they give a small weight for a large motion blur amount v, and give a large weight value for a small motion blur amount v. The constant c is a threshold for defining the motion blur amount v effective for estimation of the position and orientation, and may be set based on the allowable accuracy of estimation of the position and orientation or decided from the largest value of all the motion blur amounts v. A method of setting the constant c is not limited, and need only set a weight based on the motion blur amount v.

Let $w_{2D}i$ be a weight given to the correspondence data of the feature of a local edge, and $w_{3D}j$ be a weight given to the correspondence data of the feature of a local surface. Then, a weight matrix W is given by:

$$W = \begin{bmatrix} w_{2D}0 & & & & & 0 \\ & \ddots & & & & \\ & & w_{2D}i & & & \\ & & & w_{3D}0 & & \\ & & & & \ddots & \\ 0 & & & & & w_{3D}j \end{bmatrix} \quad (11)$$

The weight matrix W is an Lc×Lc square matrix in which all elements except for diagonal elements are 0. The diagonal elements are weights $w_{2D}i$ and $w_{3D}j$. By using the weight matrix W, equation (9) is rewritten into:

$$WJ\Delta s = WE \quad (12)$$

The position and orientation estimation unit 160 calculates the correction value Δs (S164) by solving equation (12) using the generalized inverse matrix given by:

$$\Delta s = (J^T W J)^{-1} J^T W E \quad (13)$$

The position and orientation estimation unit 160 updates the coarse position and orientation s of the target object 40 using the correction value Δs obtained by equation (13) (s+Δs) (S165). A case in which a Gauss-Newton method is used as the nonlinear optimization method has been explained. The nonlinear optimization method is not limited to this. Other nonlinear optimization methods such as a Newton-Raphson method, Levenberg-Marquardt method, steepest descent method, and conjugate gradient method may be used.

The position and orientation estimation unit 160 determines whether the position and orientation updated in step S165 has converged. In other words, it is determined whether iterative calculation is necessary (S166). That is, when the correction value Δs is almost 0, or a difference in the sum of squares of an error vector before and after correction is almost 0, it is determined that the position and orientation has converged. If the position and orientation has not converged, the process returns to step S161, and the position and orientation calculation processing is performed again using the updated coarse position and orientation s.

If it is determined that the updated position and orientation has converged, the position and orientation estimation unit 160 decides the position and orientation as the final estimated value of the relative position and orientation between the capturing device 320 and the target object 40 (S167), thereby terminating the position and orientation estimation processing.

As described above, based on the relative speed between the target object 40 and the capturing device 320 and the shape of the target object 40, a degradation degree for each of the pieces of observation information of the grayscale image and range image is determined, and weights are set so as to mainly use observation information with a small degradation degree, thereby estimating the position and orientation. Therefore, even if a motion blur occurs due to a capture on move to cause degradation of observation information, it is possible to estimate the position and orientation with high accuracy.

Second Embodiment

Measurement and information processing according to the second embodiment of the present invention will be described below. Note that the same reference numerals as those in the first embodiment denote the same components in the second embodiment and a detailed description thereof will be omitted.

In the first embodiment, the method of predicting motion blur amounts as the degradation degrees of the pieces of observation information of the grayscale image and range image based on the relative speed between the target object 40 and the capturing device 320 and the shape of the target object 40 has been explained. In the second embodiment, a method of estimating motion blur amounts from the pieces of observation information of an obtained grayscale image and range image without using the relative speed as preliminary knowledge will be described.

[Apparatus Arrangement]

Figure 7:
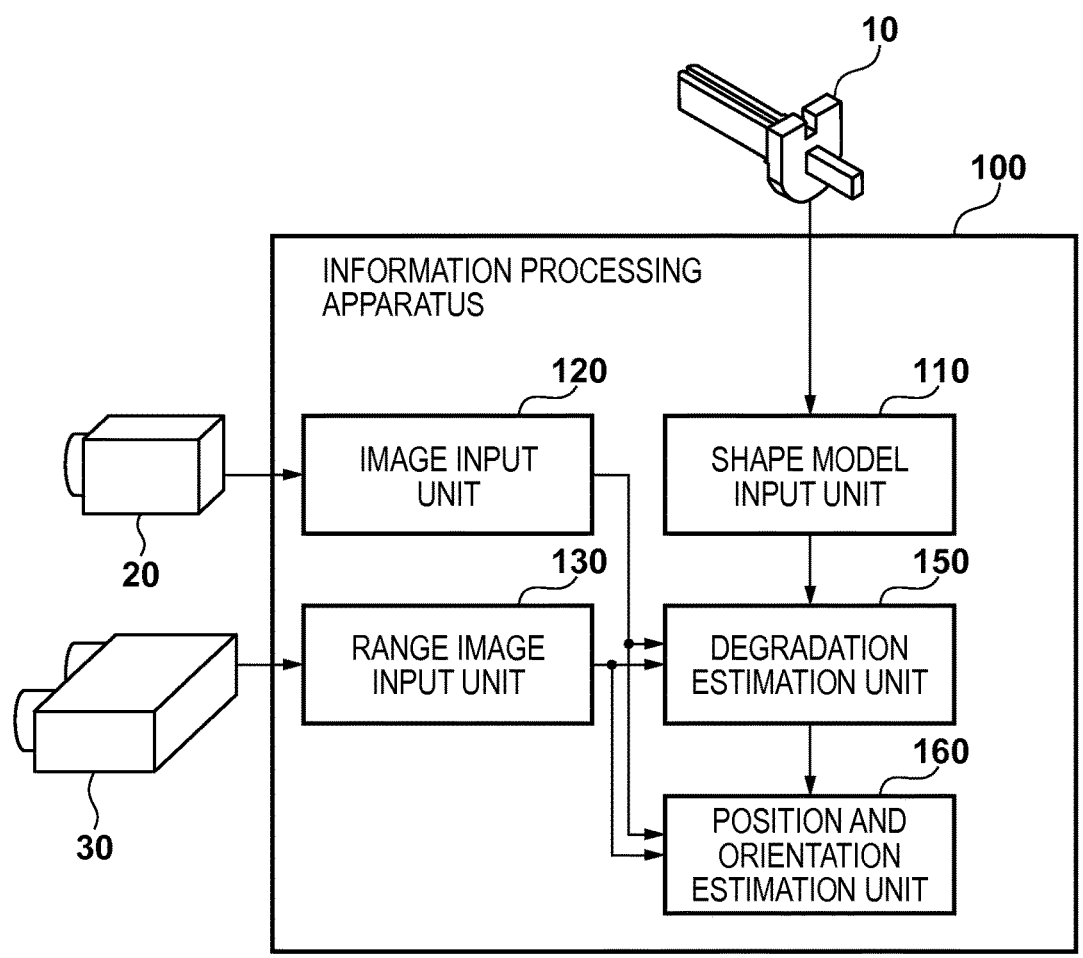
FIG. 7 is a block diagram showing the arrangement of an information processing apparatus according to the second embodiment.

FIG. 7 is a block diagram showing the arrangement of an information processing apparatus 100 according to the second embodiment. The difference from the arrangement shown in FIG. 1 is that no speed input unit 140 is included, and a degradation estimation unit 150 is added as output destinations of an image input unit 120 and range image input unit 130.

In the second embodiment, acquisition of an exposure time in the image input unit 120 and acquisition of a measurement time in the range image input unit 130 are not essential. However, the range image input unit 130 acquires, from a range image capturing device 30, a captured image (to be referred to as a "pattern light image" hereinafter) of measurement pattern light captured by irradiating a target object 40 with a multi-slit line, which serves as the calculation source of a range image.

Based on a grayscale image and range image captured by a capturing device 320, the degradation estimation unit 150 estimates the degradation degrees of the pieces of observation information of the grayscale image and range image. The degree of a blur of the observation information including a motion blur is estimated as a degradation degree, which will be described in detail later.

[Position and Orientation Estimation Processing]

Position and orientation estimation processing performed by the information processing apparatus 100 according to the second embodiment will be described with reference to a flowchart shown in FIG. 8. Processes in steps S11 to S13 are the same as those in the first embodiment and a detailed description thereof will be omitted. Note that acquisition of an exposure time and acquisition of a measurement time are not performed, and a pattern light image is acquired in addition to the range image, as described above.

The degradation estimation unit 150 calculates blur amounts including motion blurs as the degradation degrees of the pieces of observation information of the grayscale image and range image using the grayscale image and pattern light image (S24). That is, a blur amount is calculated for each pixel of each of the grayscale image and pattern light image, thereby generating the first blur amount image indicating the blur amount of the grayscale image and the second blur amount image indicating the blur amount for the range image. The first and second blur amount images have the same size, and the respective pixels of the images are associated with each other.

As a method of generating a blur amount image by calculating a blur amount for each pixel from an image, for example, a blur estimation method disclosed in literature 3 below can be used. The degradation estimation unit 150 applies the blur estimation method disclosed in literature 3 to the grayscale image and pattern light image to generate the first and second blur amount images.

Literature 3: Yusuke Mochizuki and Kimiya Aoki, "Study on Method of Estimating Defocus Blur Strength Which is Not Space-Invariant in Still Image", Actual Use of Vision Technology workshop ViEW2012, IS1-C5, 2012.

Note that a method of estimating a blur amount from a single image is not limited to the method disclosed in literature 3. Any other methods may be used as long as they can estimate a blur amount for each pixel from an image.

Instead of estimating a blur amount from a pattern light image, a blur amount may be estimated directly from a range image to generate the second blur amount image. For example, it is known that when a blur occurs in a pattern light image, even the range values of close points on the same plane, which are calculated from the image, largely vary. To deal with this, a variation in an adjacent region is calculated for each pixel of the range image, and regarded as a blur amount, thereby generating the second blur amount image.

A position and orientation estimation unit 160 generates correspondence data between the grayscale image and the feature of each local edge and that between the range image and the feature of each local surface, and calculates the position and orientation of the target object 40 based on the blur amount calculated in step S24 (S25). The position and orientation estimation processing in step S25 is almost the same as that in step S16 in the first embodiment, and only the difference from the processing in step S16 will be explained.

In the second embodiment, no calculation of a motion blur amount for each of the features of local edges and the features of local surfaces is performed. To cope with this, a blur amount is set for each piece of observation information of the grayscale image with reference to the first blur amount image, and a blur amount is set for each piece of observation information of the range image with reference to the second blur amount image, thereby calculating the weight of each correspondence data based on the blur amounts for the respective pieces of observation information (S163 of FIG. 6). Then, a correction value Δs is calculated using the correspondence data and weights (S164 of FIG. 6).

As described above, blur amounts are calculated as the degradation degrees of the pieces of observation information of the grayscale image and range image from the grayscale image and pattern light image (or range image), and weights are set so as to mainly use observation information with a small blur amount, thereby estimating the position and estimation. Therefore, even if a motion blur occurs due to a capture on move to cause degradation of observation information, it is possible to estimate the position and orientation with high accuracy.

Third Embodiment

Measurement and information processing according to the third embodiment of the present invention will be described below. Note that the same reference numerals as those in the first and second embodiments denote the same components in the third embodiment and a detailed description thereof will be omitted.

As a preferable application of an information processing apparatus 100 for estimating a position and orientation, the following mode can be considered. That is, the position and orientation of a target object 40 is estimated based on a grayscale image and range image obtained by an image capturing device 20 and a range image capturing device 30, and work such as gripping of the target object 40 by an industrial robot arm is performed based on the estimation result.

An application of the information processing apparatus 100 for estimating a position and orientation will be explained with reference to FIG. 9. FIG. 9 shows an example of the arrangement of a robot system serving as a working apparatus for performing an operation of, for example, changing the position and/or orientation of the target object 40 using the information processing apparatus 100 and robot 60 described in the first or second embodiment.

The robot 60 is controlled by a robot controller, and performs an operation of, for example, gripping an object by moving its fingers to a designated position. Since the placement position of the target object 40 on a workbench changes, it is necessary to estimate the current position and orientation of the target object 40 and control gripping of the robot 60 and the like.

The image capturing device 20 is a camera for capturing a general two-dimensional image, and the range image capturing device 30 is a range sensor for measuring the distance to the surface of the target object 40. These devices are arranged at positions at which the target object 40 can be captured, for example, at the distal end of the robot arm.

The information processing apparatus 100 estimates the position and orientation of the target object 40 based on a grayscale image obtained from the image capturing device 20 and a range image obtained from the range image capturing device 30. The estimated position and orientation of the target object 40 is input to the robot 60 to control the robot arm to grip the target object 40. Estimation of the position and orientation of the target object 40 by the information processing apparatus 100 allows operations such as gripping of the target object 40 by the robot 60 even if the position of the target object 40 is indefinite.

Modification of Embodiments

In the above embodiments, a case in which the position and orientation is estimated by setting a weight based on a degradation degree for each piece of observation information. A weight setting method, however, is not limited to the methods described in the above embodiments.

For example, the position and orientation may be estimated by setting a utilization ratio (weight) for each of a grayscale image and range image to indicate which of the pieces of observation information of the grayscale image and range image is to be emphasized. In this case, the degradation degree of one piece of information is calculated for the whole grayscale image, and the degradation degree of one piece of information is calculated for the whole range image. As a method of calculating the degradation degree of information for the whole image, for example, the degradation degree is calculated for each piece of observation information, and a statistic value such as an average value, median, largest value, or smallest value of the degradation degrees is set as the degradation degree of the information for the whole image. The usage ratios (weights) are calculated based on the calculated degradation degrees of the whole grayscale image and whole range image, respectively, thereby estimating the position and orientation.

The usage ratios are calculated by obtaining the sum of the degradation degree of the whole grayscale image and that of the whole range image, and dividing the respective degradation degrees by the obtained sum. The usage ratios are set in $w_{2D}i$ and $w_{3D}j$ of equation (11) to estimate the position and orientation. At this time, if one of the degradation degrees is significantly large and the usage ratio becomes 0, the position and orientation is estimated without using one of the pieces of observation information.

Instead of calculating the degradation degree of the information of the whole image, the degradation degree of information may be calculated for each region of the image to estimate the position and orientation. That is, a method of calculating the degradation degree of information and a method of setting a weight are not limited as long as the weight of observation information with a large degradation degree can be made small when estimating the position and orientation.

A model formed from the features of local surfaces and the features of local edges has been exemplified as the three-dimensional shape model 10. Other expression forms may be used as a three-dimensional shape model. For example, a set of polygons each formed from three points, three sides, and one plane, a set of simple three-dimensional points, and a method of parametrically expressing a three-dimensional shape using a combination of implicit functions can be used.

A projector or liquid crystal projector can be used for pattern light projection. The present invention, however, is not limited to them, and any apparatus adopting a method capable of performing pattern light projection can be used. For example, a projector using a DMD (Digital Mirror Device) or LCOS (Liquid Crystal On Silicon) may be used.

Estimation of the position and orientation based on optimization calculation has been explained above. However, other methods can be used. For example, a number of position and orientations may be generated to exhaustively cover values of six degrees of freedom in a predetermined range centering a coarse position and orientation. Matching of geometric features observed in each position and orientation with a grayscale image and range image may be evaluated to estimate the position and orientation.

A case in which the grayscale and range image are simultaneously used to estimate the position and orientation has been explained above. The present invention, however, is also applicable when estimating the position and orientation using only the grayscale image or the range image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094873, filed May 1, 2014 which is hereby incorporated by reference herein in its entirety.

What is claimed is:

1. An information processing apparatus comprising:
a holding unit configured to hold a shape model of an object to be measured;
one or more processors; and
at least one memory coupled to the one or more processors, the at least one memory having instructions stored thereon which, when executed by the one or more processors cause the information processing apparatus to:
input an image of the object obtained by a first device,
input range information obtained by a second device, wherein the range information indicates surface positions of the object,
estimate a first degree of blur as a result of capturing the image during relative motion between the object and the first device, and a second degree of blur as a result of receiving the range information during relative motion between the object and the second device, and
estimate a position and/or orientation of the object based on the image and/or range information, the shape model, and the first and second degrees of blur.

2. The information processing apparatus according to claim 1, wherein the at least one memory has instructions stored thereon which, when executed by the one or more processors further cause the information processing apparatus to input a velocity of each of the relative motions, and
estimate the first and second degrees of blur based on the velocity and the shape model.

3. The information processing apparatus according to claim 2, wherein the at least one memory has further instructions stored thereon which, when executed by the one or more processors cause the information processing apparatus to estimate amounts of motion blur as the first and second degrees of blur.

4. The information processing apparatus according to claim 1, wherein the at least one memory has further instructions stored thereon which, when executed by the one or more processors cause the information processing apparatus to estimate the first degree of blur from the image, and estimate the second degree of blur from the range information.

5. The information processing apparatus according to claim 1, wherein the at least one memory has further instructions stored thereon which, when executed by the one or more processors cause the information processing apparatus to input an image obtained by capturing a pattern for measuring the range information from the second device, and
estimate the first degree of blur from the image obtained by capturing the object, and estimate the second degree of blur from the image obtained by capturing the pattern.

6. The information processing apparatus according to claim 5, wherein the at least one memory has further instructions stored thereon which, when executed by the one or more processors cause the information processing apparatus to estimate blur amounts of images as the first and second degrees of blur.

7. The information processing apparatus according to claim 1, wherein the at least one memory has further instructions stored thereon which, when executed by the one or more processors cause the information processing apparatus to set a weight for the image and a weight for the range information used in the estimation of the position and/or orientation of the object, based on the first and second degrees of blur, and associate the shape model with the image and the range information using each weight to estimate the position and/or orientation of the object.

8. The information processing apparatus according to claim 1, wherein the at least one memory has further instructions stored thereon which, when executed by the one or more processors cause the information processing apparatus to generate correspondence data to associate features of local edges of the shape model with image features of the image and correspondence data to associate features of local surfaces of the shape model with position information of the range information, and set weights for those correspondence data based on the first and second degrees of blur so as to estimate the position and/or orientation of the object using those correspondence data and the weights.

9. A measurement apparatus for measuring a position and/or orientation of an object to be measured, comprising:
a first capturing device configured to capture an image of the object;
a second capturing device configured to measure range information indicating surface positions of the object; and
the information processing apparatus according to claim 1.

10. A working apparatus comprising:
the measurement apparatus according to claim 9; and
an operation unit configured to change a position and/or orientation of an object, or a position and/or orientation of first and second capturing devices of the measurement apparatus, based on an estimation result of the position and/or orientation of the object by the measurement apparatus.

11. The apparatus according to claim 10, wherein the operation unit comprises a robot having a movable axis that is an axis for rotational motion and/or an axis for translation.

12. An information processing method comprising:
using a processor to perform steps of:
holding a shape model of an object to be measured;
inputting an image of the object obtained by a first device;

inputting range information obtained by a second device, wherein the range information indicates surface positions of the object;

estimating a first degree of blur as a result of capturing the image during relative motion between the object and the first device, and a second degree of blur as a result of receiving the range information during relative motion between the object and the second device; and estimating a position and/or orientation of the object based on the image and/or range information, the shape model, and the first and second degrees of blur.

13. A non-transitory computer readable medium storing a computer-executable program for causing a computer to perform an information processing method, the method comprising steps of:

holding a shape model of an object to be measured;

inputting an image of the object obtained by a first device;

inputting range information obtained by a second device, wherein the range information indicates surface positions of the object;

estimating a first degree of blur as a result of capturing the image during relative motion between the object and the first device, and a second degree of blur as a result of receiving the range information during relative motion between the object and the second device; and estimating a position and/or orientation of the object based on the image and/or range information, the shape model, and the first and second degrees of blur.

* * * * *